United States Patent
Burckart et al.

(10) Patent No.: US 8,041,821 B2
(45) Date of Patent: Oct. 18, 2011

(54) CONNECTION POOL MANAGEMENT

(75) Inventors: Erik J. Burckart, Raleigh, NC (US); David B. Gilgen, Raleigh, NC (US); Craig A. Lanzen, Lambertville, MI (US)

(73) Assignee: International Business Machines Corporation, Armonk, NY (US)

( * ) Notice: Subject to any disclaimer, the term of this patent is extended or adjusted under 35 U.S.C. 154(b) by 1805 days.

(21) Appl. No.: 10/723,924

(22) Filed: Nov. 26, 2003

(65) Prior Publication Data

US 2005/0120117 A1    Jun. 2, 2005

(51) Int. Cl.
G06F 15/16    (2006.01)
G06F 15/173    (2006.01)

(52) U.S. Cl. .................. 709/227; 709/226; 709/250

(58) Field of Classification Search .......... 709/250, 709/226, 227
See application file for complete search history.

(56) References Cited

U.S. PATENT DOCUMENTS

| | | | | |
|---|---|---|---|---|
| 5,093,912 | A * | 3/1992 | Dong et al. | 718/104 |
| 6,105,067 | A * | 8/2000 | Batra | 709/227 |
| 6,141,325 | A * | 10/2000 | Gerstel | 370/238 |
| 6,477,569 | B1 * | 11/2002 | Sayan et al. | 709/223 |
| 6,775,707 | B1 * | 8/2004 | Bennett et al. | 709/233 |
| 6,988,140 | B2 | 1/2006 | Chintalapati et al. | |
| 7,058,717 | B2 * | 6/2006 | Chao et al. | 709/226 |
| 7,076,556 | B1 * | 7/2006 | Brock et al. | 709/228 |
| 7,080,126 | B2 * | 7/2006 | Srivastava et al. | 709/206 |
| 7,111,070 | B2 * | 9/2006 | Bennett et al. | 709/237 |
| 7,325,056 | B2 * | 1/2008 | Srivastava et al. | 709/224 |
| 7,574,531 | B2 * | 8/2009 | Bennett et al. | 709/249 |
| 7,596,713 | B2 * | 9/2009 | Mani-Meitav et al. | 714/6.32 |
| 7,631,083 | B2 * | 12/2009 | Srivastava et al. | 709/226 |
| 7,698,434 | B2 * | 4/2010 | June et al. | 709/227 |
| 7,702,796 | B2 * | 4/2010 | Shen et al. | 709/227 |
| 7,702,906 | B1 * | 4/2010 | Karr et al. | 713/164 |
| 7,716,146 | B2 * | 5/2010 | Moran et al. | 706/15 |
| 7,747,717 | B2 * | 6/2010 | Colrain | 709/223 |
| 7,937,493 | B2 * | 5/2011 | Colrain et al. | 709/244 |
| 7,953,860 | B2 * | 5/2011 | Colrain et al. | 709/227 |
| 2002/0059428 | A1 | 5/2002 | Susai et al. | |

(Continued)

FOREIGN PATENT DOCUMENTS

WO    WO 02/091709 A2    11/2002

OTHER PUBLICATIONS

Dale, Nell B. "C++ Plus Data Structures" 2003, MA Jones and Bartlett Publishers, ISBN 978076370481, pp. 196-197 and 726.*

(Continued)

*Primary Examiner* — Phuoc Nguyen
*Assistant Examiner* — Daniel Murray
(74) *Attorney, Agent, or Firm* — Steven M. Greenberg, Esq.; Carey, Rodriguez, Greenberg & Paul

(57) ABSTRACT

The present invention is a method, system and apparatus for highly efficient connection pool management. In a preferred aspect of the invention, a highly efficient connection pool management system can include a connection pool configured to store one or more idle connections. The system further can include a connection manager programmed for coupling to the connection pool. The connection manager further can be programmed to validate individual ones of the idle connections by issuing a non-blocking input/output (I/O) operation to each of the individual ones of the idle connections.

13 Claims, 4 Drawing Sheets

U.S. PATENT DOCUMENTS

| | | | | |
|---|---|---|---|---|
| 2002/0156897 | A1* | 10/2002 | Chintalapati et al. | 709/227 |
| 2003/0037263 | A1* | 2/2003 | Kamat et al. | 713/202 |
| 2003/0093499 | A1 | 5/2003 | Messinger et al. | |
| 2004/0088413 | A1* | 5/2004 | Bhogi et al. | 709/226 |
| 2004/0221031 | A1* | 11/2004 | Desai | 709/224 |
| 2005/0021832 | A1* | 1/2005 | Bennett et al. | 709/235 |
| 2005/0038890 | A1* | 2/2005 | Masuda et al. | 709/224 |
| 2005/0165925 | A1* | 7/2005 | Dan et al. | 709/224 |
| 2005/0262183 | A1* | 11/2005 | Colrain et al. | 709/200 |
| 2006/0031388 | A1* | 2/2006 | Tankov et al. | 709/217 |
| 2007/0073822 | A1* | 3/2007 | Bennett et al. | 709/206 |
| 2007/0261054 | A1* | 11/2007 | Chesebro et al. | 718/100 |
| 2007/0268910 | A1* | 11/2007 | Shen et al. | 370/395.21 |
| 2007/0288924 | A1* | 12/2007 | Srivastava et al. | 718/100 |
| 2008/0151767 | A1* | 6/2008 | Moran et al. | 370/252 |
| 2008/0155424 | A1* | 6/2008 | Moran et al. | 715/736 |
| 2008/0228923 | A1* | 9/2008 | Chidambaran et al. | 709/227 |
| 2009/0043892 | A1* | 2/2009 | June et al. | 709/226 |
| 2009/0043897 | A1* | 2/2009 | June et al. | 709/228 |
| 2009/0064199 | A1* | 3/2009 | Bidelis et al. | 719/328 |
| 2009/0172094 | A1* | 7/2009 | Srivastava et al. | 709/203 |
| 2011/0055368 | A1* | 3/2011 | Colrain et al. | 709/223 |

OTHER PUBLICATIONS

Main and Savitch "Data Structures and Other Objects Using C++" 2001, Addison Wesley Longman, ISBN 0201702975, Second Ed. pp. 337-338 and 354.*

Savitch, Walter "Problem Solving with C++, The Object of Programming" 1999, Addison Wesley, ISBN 0201357496, Second Ed. pp. 714-716.*

Brown, Kevin, *Gain Extended Functionality by Writing Your Own JDBC Connection Pool*, (Dec. 12, 2001) (visited Nov. 13, 2003) <http://builder.com.com/5100-6388-1045042-1.html>.

Author Unknown, *Chapter 10. Connection Pool Configuration*, JDO Genie Manual 2.2 Obeta5 (Oct. 21, 2003)—Copyright© 2003 Hemisphere Technologies (visited Nov. 13, 2003) <http://downloads.hemtech.co.za/jdo/manual/connection_pool.html>.

Author Unknown, *Pramati Connection Pooling Concepts*, Copyright Pramati Technologies(visited Nov. 13, 2003) <http://www.pramati.com/docstore/1230006/help/conn_pool/concept.htm.

Author Unknown, *Advanced Programming for the Java 2 Platform Chapter 8 Continued: Connection Pooling*, Copyright © 1995-2003 Sun Microsystems, Inc. (visited Nov. 13, 2003) <http://java.sun.com/PrintPage.jsp?url=http%3A//developer.java.sun.com/developer/onlineTraining/Programming/Jdc...>.

* cited by examiner

CONNECTION POOL MANAGEMENT

BACKGROUND OF THE INVENTION

1. Statement of the Technical Field

The present invention relates to the field of socket based data communications and more particularly to connection pool management.

2. Description of the Related Art

Connection pools represent a significant advance in the art of distributed computing. Prior to the implementation of the connection pool, client processes in a client-server configuration established direct connections with back-end server processes on demand. Often, these direct connections take the form of a socket between two ports, each port residing at a particular network address. Opening a connection between a client process and a server process can require the consumption of significant computing resources. Specifically, first a desired socket must be identified in the client process and requested of the server process. A handshaking process can result in consequence of which the connection can be established between the client and server processes.

It will be recognized by the skilled artisan that in an application where multiple, repeated connections will be required, a tremendous amount of computing resources can be consumed merely opening connections when required. Yet, particularly in data intensive applications involving repeated remote connections to back end database servers, so much can be the case. Further, it needn't always be the case that a connection can be established reliably. In this regard, when a socket cannot be established between the processes, the attempt can fail leaving little recourse for the client process. Unfortunately, the failure to attain a connection for use by the client process can range from too few available connections to malfunctioning connections.

Connection pooling is widely viewed as the appropriate tool to overcome the clear deficiencies of conventional computer process connectivity. Connection pooling is a technique used by applications which open many connections to a finite number of back-end server processes. The reverse proxy represents one typical application of the connection pool. In the prototypical connection pool, connections are pre-established with back-end server processes. These connections can be organized in a data structure such as an array or list in which the connections can remain idle until provisioned either by a host server process for the benefit of an external client, or directly by a client process. In this way, when client processes require the use of a connection with a back-end server process, it will not be necessary to create the connection each time.

In managing a pool of idle connections, an efficient process consuming little computing overhead can be required to validate that the connections which have not been provisioned recently remain valid and useable on demand. In this regard, it is known to perform placebo transactions using the idle connections to ensure the reliability of the idle connections. Of course, to perform the placebo transaction with respect to any one idle connection necessarily consumes the idle connection such that any attempt to access the idle connection can be blocked. While the liberal use of threads can overcome the blocking action of the placebo transaction, spawning a great many threads for concurrent usage can consume significant computing resources. Thus, in a pool of multiple idle connections, validating each connection using threaded validation processes can produce the same level of computing overhead that otherwise would exist in consequence of invalid idle connections.

SUMMARY OF THE INVENTION

The present invention addresses the deficiencies of the art in respect to connection pool management and provides a novel and non-obvious method, system and apparatus for highly efficient connection pool management. In a preferred aspect of the invention, a connection pool management system can include a connection pool configured to store one or more idle connections. The system further can include a connection manager programmed for coupling to the connection pool. The connection manager further can be programmed to validate individual ones of the idle connections by issuing a non-blocking input/output (I/O) operation to each of the individual ones of the idle connections.

The connection pool can include an array configuration. Each element in the array configuration can include both a timestamp data member and also a reference to one of the idle connections. The connection pool also can include a configuration for a last-in first-out (LIFO) ordering of the idle connections. Finally, the connection pool can include a configuration for storing a global timestamp. The global timestamp can indicate a time value when an oldest one of idle connections had been added to the connection pool.

The present invention also can include a connection pool management method. In the method of the invention, responsive to adding a first one of multiple idle connections to a connection pool, a global timestamp can be recorded to indicate a time value when the first idle connection had been added to the connection pool. Similarly, responsive to adding subsequent idle connections to the connection pool, individual timestamps can be recorded in the connection pool in association with corresponding idle connections. A timestamp of an oldest one of the idle connections can be compared to the global timestamp to determine whether a timeout condition has arisen. in consequence, when determining that a timeout condition has arisen, at least one of the idle connections can be probed with a non-blocking I/O request in order to validate the idle connections.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for managing a connection pool in a highly efficient manner. In accordance with the present invention an array can be configured to store one or more established connections in a LIFO arrangement. Each occupied entry in the array additionally can store a timestamp indicating first when the connection had been added to the array and subsequently when the connection had last been validated. Importantly, only timestamp for the last added connection can be compared to a pre-established time-out for the pool to determine when the connections in the pool ought to be validated.

During validation, each connection in the array can be queried to determine whether the timestamp of the connection exceeds the pre-configured time-out. If the timestamp of the connection exceeds the time-out, a non-blocking I/O operation can be applied through the connection to determine whether the connection remains valid. If the non-blocking I/O operation succeeds, the timestamp can be updated to reflect the present time and the next connection in the array can be tested. Otherwise, the connection can be removed from the array. Importantly, the skilled artisan will recognize that by applying merely a non-blocking I/O operation to the connection, rather than spawning an independent thread to test the validity of the connection, substantial consumption of computing resources can be avoided.

Figure 1:
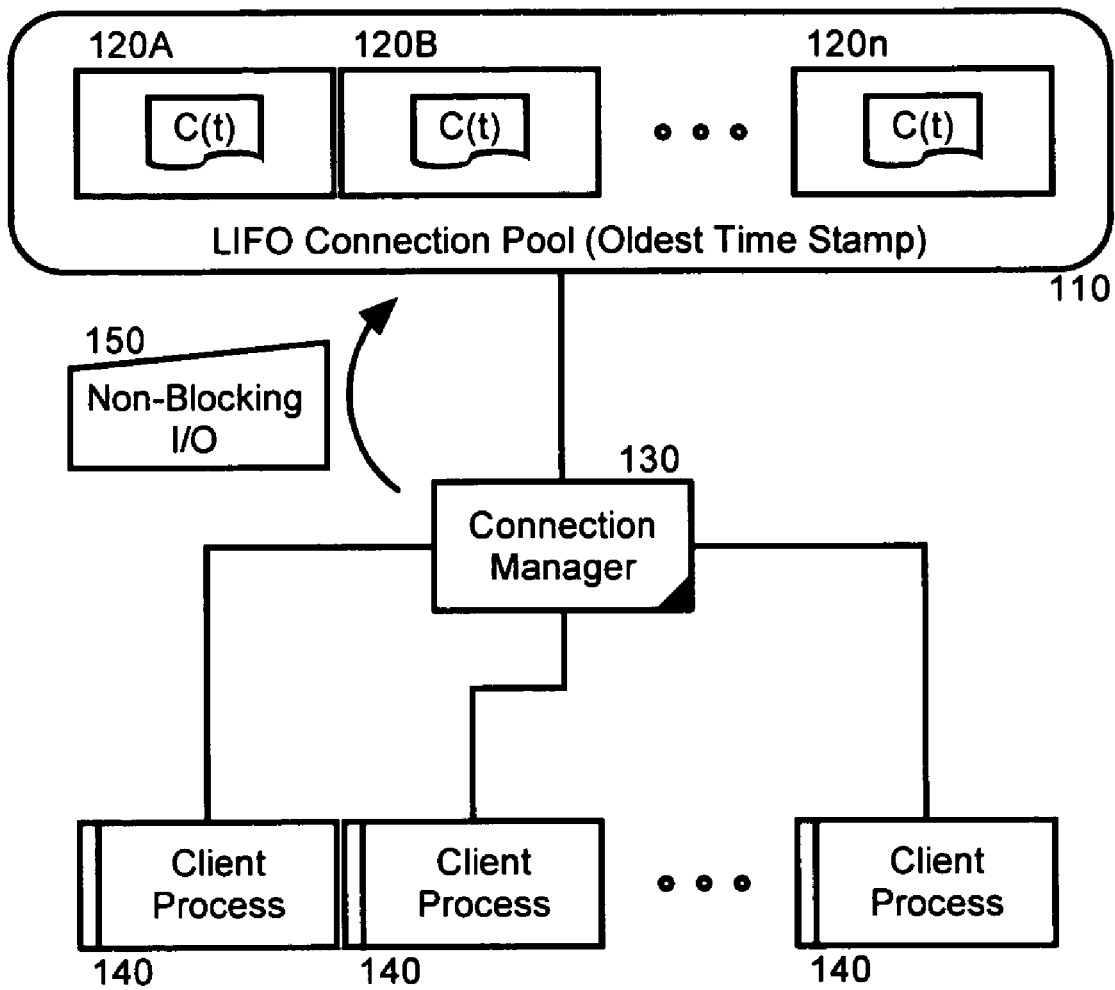
FIG. 1 is a schematic illustration of a connection manager configured to manage a connection pool in accordance with the present invention.

FIG. 1 is a schematic illustration of a connection manager configured to manage a connection pool in accordance with the present invention. A connection manager 130 can be coupled to a connection pool 110 and one or more client processes 140. The client processes 140 can be directly coupled to the connection manager 130, consequently individual ones of the client processes 140 can directly request the use of a connection 120A, 120B, 120n disposed within the connection pool 110. Alternatively, the client processes 140 can request the usage of a connection 120A, 120B, 120n intermediately through a server process (not shown) coupled to the connection manager 130.

In either case, the connection pool 110 can include one or more idle connections 120A, 120B, 120n. The connections 120A, 120B, 120n can be arranged within the connection pool 110 in an array type data structure. The array type data structure can be accessed by the connection manager 130 in a LIFO manner. As a result, the array type data structure can take the form of a stack in which the most recently added idle connections in the connection pool 110 can be used for subsequent requests to provision a connection. Accordingly, the likelihood of provisioning a valid connection can be enhanced substantially.

Each of the connections 120A, 120B, 120n in the connection pool 110 can have associated therewith a timestamp. The timestamp can indicate when each individual one of the connections 120A, 120B, 120n had been added to the connection pool 110. The timestamp can be updated at a subsequent time when the individual ones of the connections 120A, 120B, 120n are validated in accordance with the present invention. In any case, the timestamps of the connections 120A, 120B, 120n can be compared with a global timestamp associated with the connection pool 110 to determine when validation will be required. The global timestamp can hold the value of the oldest timestamp in the connection pool 110. When a newly idle one of the connections 120A, 120B, 120n is added to the connection pool 110, the timestamp of the newly idle one of the connections 120A, 120B, 120n can be compared to the sum of the global timestamp and a pre-configured time-out value. If the timestamp of the newly idle one of the connections 120A, 120B, 120n exceeds the sum, the entire connection pool 110 can be validated.

During the validation process, the connection manager 130 can temporarily suspend new additions and removals from the connection pool 110. Subsequently, the array can be traversed sequentially. At each element in the array, the timestamp of the corresponding one of the connections 120A, 120B, 120n in the array element can be compared to the sum of the global timestamp and the time-out value to determine whether the corresponding one of the connections 120A, 120B, 120n ought to be validated.

If so, a non-blocking I/O operation 150 can be applied to the corresponding one of the connections 120A, 120B, 120n. If the operation fails, the corresponding one of the connections 120A, 120B, 120n can be invalidated and removed from the connection pool 110. Otherwise, the timestamp can be updated with the latest time and the next one of the connections 120A, 120B, 120n in the connection pool 110 can be processed until no connections 120A, 120B, 120n remain to be validated in the connection pool 110.

Figure 2:
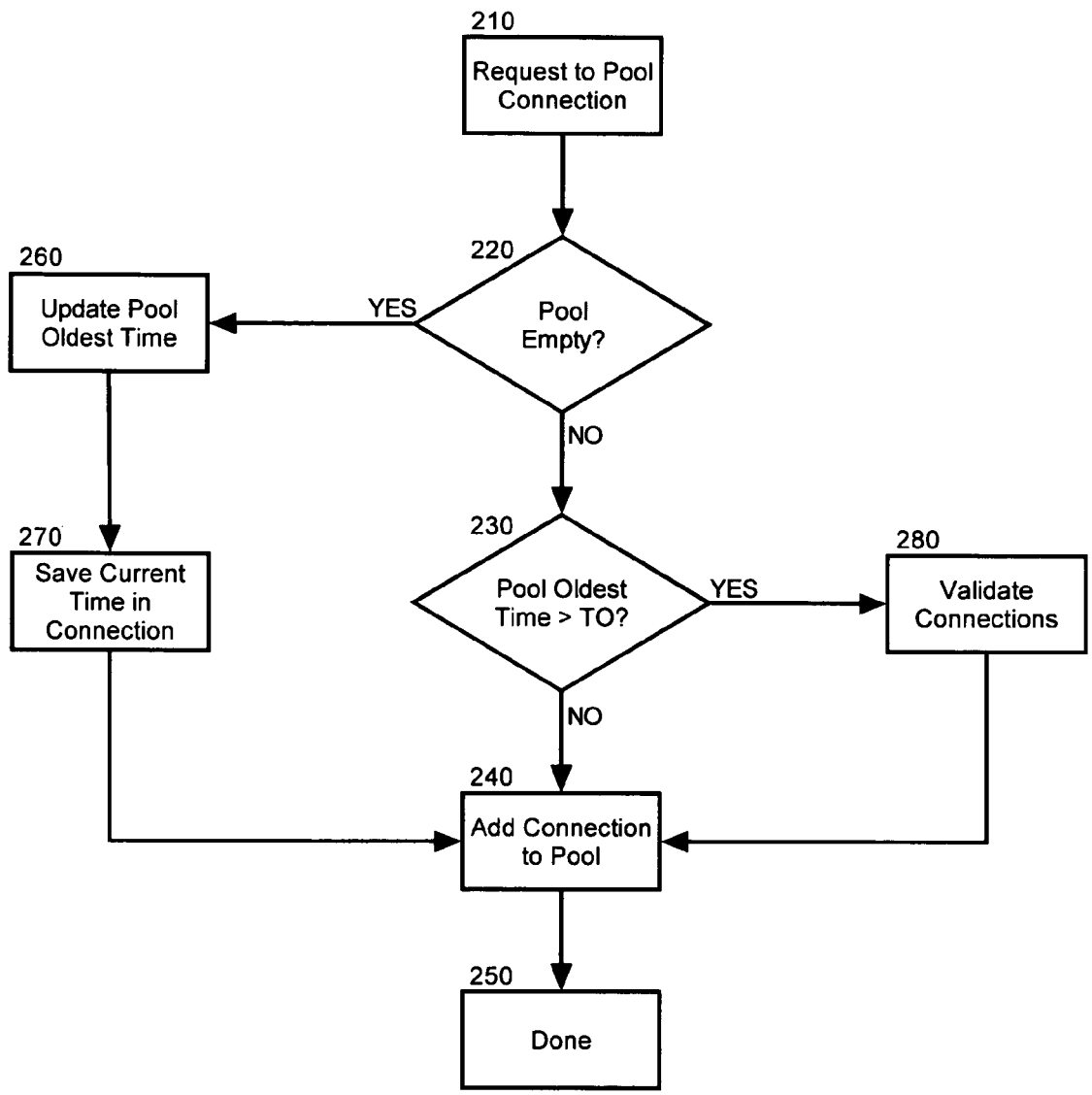
FIG. 2 is a flow chart illustrating a process for adding a new connection to the connection pool of FIG. 1.
Figure 3:
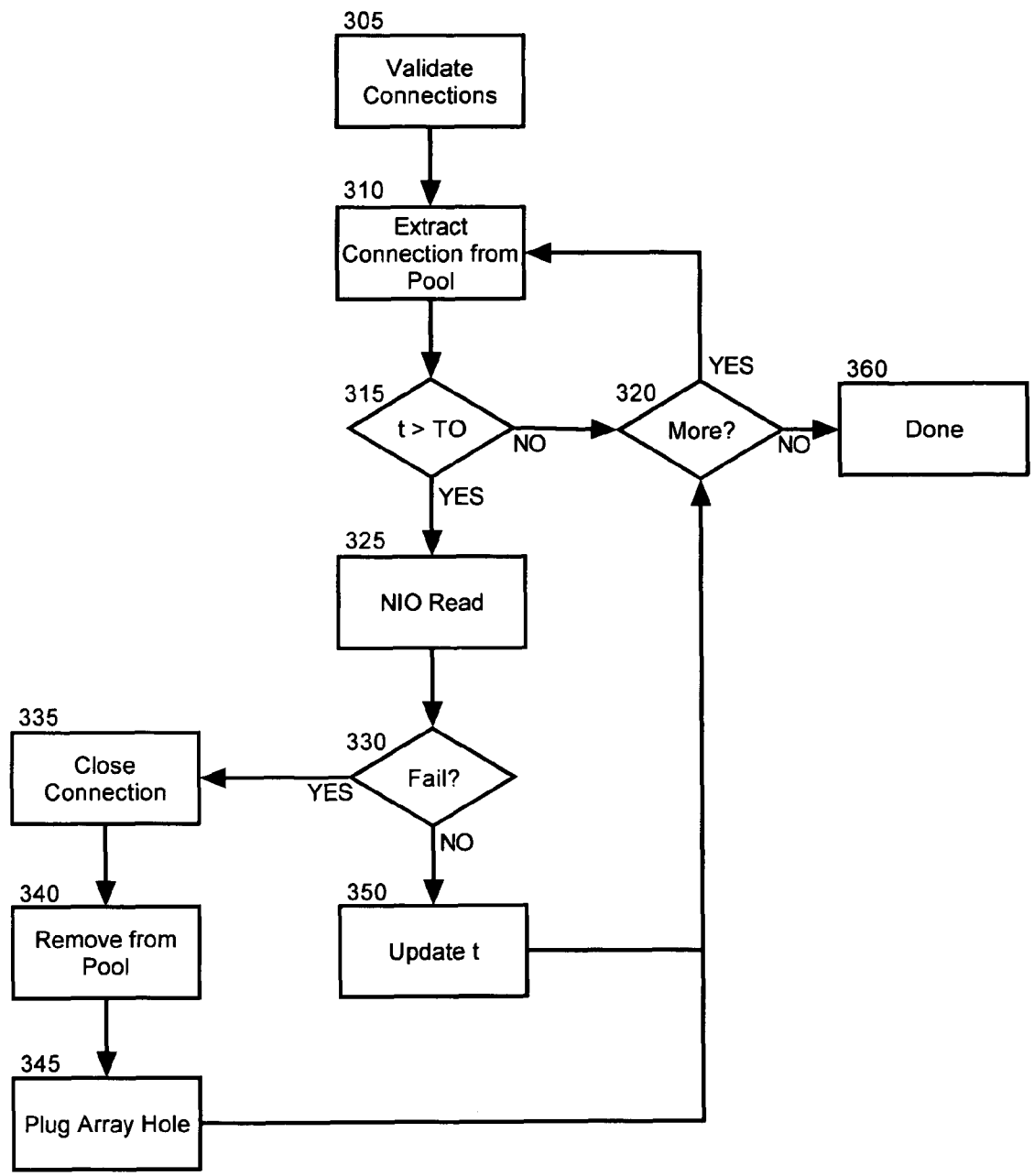
FIG. 3 is a flow chart illustrating a process for validating connections in the connection pool of FIG. 1; and, FIG. 4 is a flow chart illustrating a process for provisioning a connection in the connection pool of FIG. 1.
Figure 4:
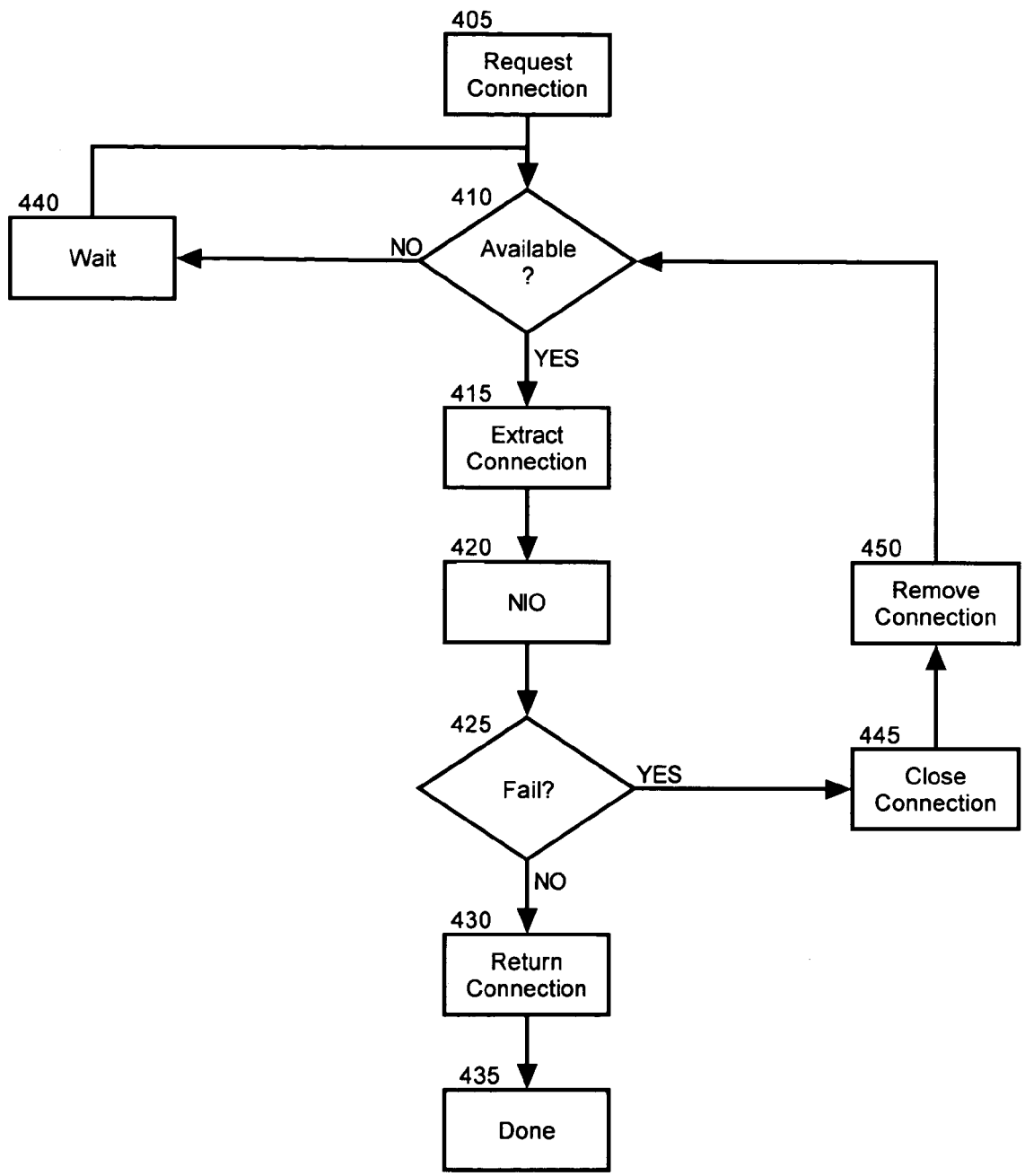

In more particular illustration of the operation of the connection manager 130, FIGS. 2 through 4 are flow charts illustrating processes for adding, validating and provisioning the connections 120A, 120B, 120n of the connection pool 110 of FIG. 1. Beginning first with FIG. 2, a flow chart is shown which illustrates a process for adding a new connection to the connection pool. Beginning first in block 210, a request can be received to pool a connection. In decision block 220, it can be determined whether the pool includes any idle connections, or whether the pool is empty. If the pool is empty, in block 260 the global timestamp of the pool can be updated to reflect the current time and the current time also can be saved in association with the new connection in block 270.

If in decision block 220, the connection pool is determined to include at least one idle connection, in decision block 230 it can be determined whether the global timestamp exceeds that of the sum of the global time stamp and a pre-established timeout value. If not, the connection can be added to the pool along with a current timestamp in block 240 and the process can end in block 250. Otherwise, in block 280, it can be determined that the entire pool must be considered for pool validation and the process can continue in FIG. 3. Notably, when referring to a timestamp herein, it is not intended to infer that all timestamps must indicate a specific time based upon a twenty-four hour clock. Rather, the timestamp equally could include an elapsed time.

FIG. 3 is a flow chart illustrating a process for validating connections in the connection pool of FIG. 1. Beginning in block 305, a request to validate the connection pool can be received. In block 310, a first connection from the pool can be retrieved for validation. In decision block 315, it can be determined whether the timestamp of the first connection exceeds that of the global timestamp in combination with the pre-established timeout value. If not, the connection need not be validated further and in decision block 320, if more connections remain to be processed, the next connection can be extracted from the pool in block 310 and the validation process can continue. Otherwise the process can end in block 360.

If, in decision block 315, it is determined that the timestamp of the first connection exceeds that of the global timestamp in combination with the pre-established timeout value, in block 325 a non-blocking I/O operation can be performed over the connection. Non-blocking I/O operations are known in the art and complete libraries have been developed for this purpose. In the case where the connection in the connection pool couples a back-end data server to a client process, a non-blocking read can be performed over the connection.

In any case, in decision block 330, if the non-blocking I/O operation fails, in block 335 the connection can be presumed invalid and closed. In block 340 the connection can be removed from the connection pool and in block 345 the array element can be "plugged" by moving the most recently added idle connection in the pool to the array element vacated by the removed idle connection. In contrast, if the non-block I/O operation does not fail, the connection can be presumed valid and its respective timestamp can be updated with the current time in block 350. In both cases, the process can continue through decision block 320 as described before. Once all of the connections have been validated, the process can end and the idle connections in the pool can be freed for provisioning by the connection manager.

In this regard, FIG. 4 is a flow chart illustrating a process for provisioning a connection in the connection pool of FIG. 1. Beginning first in block 405, a connection can be requested and in decision block 410 it can be determined whether any connections remain available for requisition. If not, in block 440 the connection manager can wait until an idle connection becomes available. Otherwise, in block 415 the last idle connection added to the connection pool can be extracted and in block 420 a non-blocking I/O operation can be performed upon the extracted connection to ensure its validity.

If in decision block 425 the non-blocking I/O operation does not fail, in block 430 the extracted connection can be returned to the connection manager for use by the requesting process and the process can end in block 435. By comparison, if in decision block 425 the non-blocking I/O operation fails, in block 445 the connection can be determined to be invalid and closed. In block 450, subsequently, the connection can be removed from the pool and the array element holding a reference to the connection can be "plugged" as described before.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer-implemented connection pool management system comprising:
    a hardware processor configured to
        responsive to a request to add a connection to a connection pool of idle connections, add the connection with a timestamp associated with the connection and determine if the timestamp associated with the added connection exceeds a sum of a global timestamp and a pre-established timeout value, wherein the timestamp of the added connection is the time when the connection was added and the global timestamp is defined as the value of the oldest timestamp in the connection pool;
        responsive to determining that the timestamp associated with the added connection exceeds the sum of the global timestamp and the pre-established timeout value, probe each idle connection in the connection pool with a non-blocking input/output (I/O) request in order to validate the entire connection pool.

2. The system of claim 1, wherein said connection pool has an array configuration wherein each element in said array configuration comprises a timestamp data member and a reference to one of said idle connections.

3. The system of claim 2, wherein said connection pool comprises a configuration for a last-in first-out (LIFO) ordering of said idle connections.

4. A connection pool management method comprising the steps of:
    responsive to a request to add a connection to a connection pool of idle connections, adding the connection with a timestamp associated with the connection and determining if the timestamp associated with the added connection exceeds a sum of a global timestamp and a pre-established timeout value, wherein the timestamp of the added connection is the time when the connection was added and the global timestamp is defined as the value of the oldest timestamp in the connection pool; and,
    responsive to determining that the timestamp associated with the added connection exceeds the sum of the global timestamp and the pre-established timeout value, probing each idle connection in the connection pool with a non-blocking input/output (I/O) request in order to validate the entire connection pool.

5. The method of claim 4, further comprising the step of updating the timestamp of each connection with a time when the connection is validated and updating said global timestamp with a new value subsequent to the probing.

6. The method of claim 4, further comprising the step of provisioning a most recently added one of said idle connections responsive to a request to provision an idle connection in said connection pool.

7. The method of claim 6, wherein said provisioning step further comprises the steps of:
    probing said provisioned idle connection with a non-blocking input/output (I/O) request in order to validate said provisioned idle connection; and,
    where said provisioned idle connection fails to validate, removing said provisioned idle connection from said connection pool and provisioning another one of said idle connections.

8. The method of claim 5, further comprising the step of removing from said connection pool each said idle connection which fails validation in said probing step.

9. A hardware machine readable storage having stored thereon a computer program for connection pool management, the computer program comprising a routine set of instructions which when executed by the machine cause the machine to perform the steps of:

responsive to a request to add a connection to a connection pool of idle connections, adding the connection with a timestamp associated with the connection and determining if the timestamp associated with the added connection exceeds a sum of a global timestamp and a pre-established timeout value, wherein the timestamp of the added connection is the time when the connection was added and the a global timestamp is defined as the value of the oldest timestamp in the connection pool;

responsive to determining that the timestamp associated with the added connection exceeds the sum of the global timestamp and the pre-established timeout value, probing each idle connection in the connection pool with a non-blocking input/output (I/O) request in order to validate the entire connection pool.

10. The hardware machine readable storage of claim 9, further comprising the step of updating the timestamp of each connection with a time when the connection is validated and updating said global timestamp with a new value subsequent to the probing.

11. The hardware machine readable storage of claim 9, further comprising the step of provisioning a most recently added one of said idle connections responsive to a request to provision an idle connection in said connection pool.

12. The hardware machine readable storage of claim 11, wherein said provisioning step further comprises the steps of:

probing said provisioned idle connection with a non-blocking input/output (I/O) request in order to validate said provisioned idle connection; and, where said provisioned idle connection fails to validate, removing said provisioned idle connection from said connection pool and provisioning another one of said idle connections.

13. The hardware machine readable storage of claim 9, further comprising the step of removing from said connection pool each said idle connection which fails validation in said probing step.

* * * * *